United States Patent [19]
Sumida et al.

[11] Patent Number: 5,139,227
[45] Date of Patent: Aug. 18, 1992

[54] PROPORTIONAL FLOW CONTROL VALVE

[75] Inventors: Mamoru Sumida; Osamu Matsumoto, both of Hyogo, Japan

[73] Assignee: Mitsubishi Denki K.K., Tokyo, Japan

[21] Appl. No.: 705,715

[22] Filed: May 23, 1991

[30] Foreign Application Priority Data

Jun. 4, 1990 [JP] Japan .................. 2-146989
Jun. 19, 1990 [JP] Japan .................. 2-160620
Jun. 19, 1990 [JP] Japan .................. 2-160622
Aug. 21, 1990 [JP] Japan .................. 2-222060

[51] Int. Cl.$^5$ ............................. F16K 31/06
[52] U.S. Cl. ..................... 251/129.08; 251/129.19; 251/333
[58] Field of Search ............... 251/129.08, 129.19, 251/333

[56] References Cited
U.S. PATENT DOCUMENTS 4,813,647 3/1989 Yagi et al. ................. 251/129.19 X

FOREIGN PATENT DOCUMENTS 63-243582 10/1988 Japan .

Primary Examiner—Arnold Rosenthal
Attorney, Agent, or Firm—Sughrue, Mion, Zinn, Macpeak & Seas

[57] ABSTRACT

A proportional flow control valve in which a valve seat is provided in the proportional flow control valve body, a valve piece is slidably mounted on a movable iron core, and is urged toward the valve seat by an elastic member disposed between the valve piece and the movable iron core, and a holder is fixedly mounted on the movable iron core so as to limit the movement of the valve piece toward the valve seat caused by the elastic member. The proportional flow control valve is high in reliability in which the leakage of fluid is substantially zeroed even when fully closed, and the difficulties are eliminated that, when its flow rate adjusting means engages with or disengages from the valve seat, hammering sounds are produced and the flow characteristic is adversely affected, and which is simple in adjustment and is maintained correct in flow characteristic at all times.

8 Claims, 7 Drawing Sheets

PROPORTIONAL FLOW CONTROL VALVE

BACKGROUND OF THE INVENTION

This invention relates to a valve which controls the flow rate of a fluid in proportion with the output of a drive source, and more particularly to a proportional flow control valve which is arranged in a by-pass path provided near the throttle valve of the suction pipe in an internal combustion engine.

An engine of electronic control fuel injection type is well know in the art in which a by-pass path is provided near the throttle valve of the suction pipe, and the by-pass path is opened or closed to control the quantity of air sucked into the engine.

FIG. 5 shows a sectional view of one example of a proportional flow control valve used to open and close the above-described by-pass path.

In FIG. 5, reference numeral 1 designates a solenoid unit; and 2, a stationary iron core extended in the solenoid unit axially. A cylindrical case 3 is fitted in the housing of the solenoid unit in such a manner that it covers the inner cylindrical surface of the housing. Flow adjusting means, namely, a movable iron core 4 is disposed in the cylindrical case 3 in such a manner that it is confronted with the stationary iron core 2. The stationary iron core 2 and the movable iron core 4 are disposed inside a pipe 7 with a return spring 5 therebetween. A bobbin 6a on which an electromagnetic coil 6 is wound is put on the pipe 7. An insulating material 3a is inserted between the electro-magnetic coil 6 and the housing of the solenoid unit 1. A spring holder 5a is used to hold the return spring 5 between the stationary iron core 2 and the movable core 4. That is, the movable iron core 4 is urged by the return spring 5 so as to move against the force of attraction of the electro-magnetic coil 6; more specifically, the movable iron core 4 is maintained pushed to the left in FIG. 5 at all times. The electro-magnetic coil 6 is connected to a lead wire 6b extended outside of the solenoid unit.

A spring 8 is arranged in such a manner as to confront through the movable iron core 4 with the return spring 5. More specifically, the spring 8 is disposed between a spring holder 9 and a step 4a formed at the end portion (the left end portion in FIG. 5) of the movable iron core 4 and the spring holder 9 is secured to the end of an adjusting screw 10.

The front end portion of the movable iron core including the step 4a, the spring 8, the spring holder 9, and the adjusting screw 10 are positioned in a chamber 11b formed in a proportional flow control valve body 11 connected to the solenoid unit 1. The proportional flow control valve body 11 has a fluid inlet passageway 11a formed in its end portion near the solenoid unit 1, and a fluid outlet passageway 11c formed in the other end portion (the left end portion in FIG. 5) in such a manner as to communicate with the aforementioned chamber 11b. One end portion (the left end portion in FIG. 5) of the pipe 7 is supported through a wadding 12 by a supporting member 13 which is fixedly provided in the proportional flow control valve body 11, so that, in the proportional flow control valve body 11, the chamber 11b of the latter 11 is separated from the fluid inlet passageway 11a.

The aforementioned adjusting screw 10 is screwed into the left end portion of the proportional flow control valve body 11, where the fluid outlet passageway 11c is formed as was described before; that is, the adjusting screw 10 is extended towards the movable iron core 4. The movable iron core 4 is maintained urged to the right in FIG. 5 by the spring 8 which is supported by the spring holder secured to the adjusting screw 10; that is, the movable iron core 4 is urged in the direction of electro-magnetic attraction at all times.

Fluid holes 7a having predetermined dimensions are formed in the front end portion (the left end portion) of the above-described pipe 7 in such a manner that they are communicated with the fluid inlet passageway 11a of the proportional flow control valve body 11, and that they are closed by the outer cylindrical wall of the movable iron core 4 when the electro-magnetic coil 6 is deenergized.

The movable iron core 4 has a communication hole 4b along its central axis so that the pressure in the chamber 11b communicated with the fluid outlet passageway 11c is balanced with the pressure in the chamber which is defined by the movable iron core 4 and the stationary iron core 2.

The elastic force of the above-described spring 8, which is connected between the step 4a of the movable iron core 4 and the spring holder 9 to urge the movable iron core 4 in the direction of attraction of the electro-magnetic coil 6, is adjusted with the adjusting screw 10 so that the position of the movable iron core 4 is determined in advance.

When, in the proportional flow control valve thus constructed, the electro-magnetic coil 6 is energized, the movable iron core 4 is moved towards the stationary iron core 2 against the elastic force of the return spring 5. In this operation, the spring 8 acting in the direction of attraction is extended as the movable iron core 4 moves in the above-described manner.

As the movable iron core 4 is moved towards the stationary iron core 2, the fluid holes 7a of the pipe 7 are opened. As a result, the fluid (air) flowing into the by-pass path from the suction pipe is allowed to flow through the fluid inlet passageway 11a, the fluid holes 7a of the pipe 7, the pitched gaps of the spring 8, and the chamber 11b into the fluid outlet passageway 11c, and through the by-pass path into the suction pipe, thus meeting the fluid in the suction pipe.

In the case of a proportional flow control valve of this type, in order to reduce the hysteresis loss due to the frictional resistance of sliding parts thereof, in general the following duty control method or dither control method are employed. In the duty control method, the electro-magnetic coil is energized and deenergized at a predetermined frequency, and the ratio of the period of time of energization ("on" time) to the period of time of deenergization ("off" time) is changed so that the movable iron core is slightly vibrated. In the dither control method, a predetermined current value is varied (a DC component is modified with an AC component), so that the movable iron core is slightly vibrated.

The proportional flow control valve shown in FIG. 5 is a spool type valve. Therefore, the fluid will leak through the gap between the movable iron core 4 which is in the form of a spool and the pipe 7 which is in the form of a sleeve. That is, as shown in FIG. 6, even when the control duty is set to zero, the flow rate will not be zeroed. On the other hand, in the by-pass air flow control of an internal combustion engine, it is desirable that, during idling; i.e., when it is unnecessary to supply by-pass air, the number of revolutions per minute of the engine is decreased with the quantity of fluid leaking from the by-pass path zeroed so that the fuel is economically used. In a vehicle small in displacement, the absolute value of the flow rate of air necessary for the idling of the engine is small, and therefore sometimes the idling of the engine can be maintained only with the quantity of air leaking from the throttle value. In this case, in view of the relation between the grade and fuel consumption of the vehicle, it is essential to decrease the speed of rotation of the engine as much as possible with the quantity of air leaking from the by-pass path during idling thereby to reduce the rate of fuel consumption.

A spool type valve in which a stopper is provided in such a manner that it abuts against the end of the control spool (movable iron core) when the electromagnetic coil is deenergized has been proposed in the art (Unexamined Japanese Utility Model Publication No. 145078/1988). The stopper serves as a valve seat in the proportional flow control valve as shown in FIG. 5, thus improving the sealing characteristic thereof. However, the provision of the valve seat suffers from the following difficulties: In the proportional flow control valve of this type, in order to reduce the hysteresis loss due to the frictional resistance of the sliding parts, the duty control or dither control is generally employed in which the electro-magnetic coil is energized and deenergized at a predetermined frequency as was described before. Therefore, flow control means comprising the movable iron core will strike against the valve seat whenever it arrives at or leaves from it, thus producing hammering sounds. As a result, an abnormal phenomenon occurs with the flow characteristic as shown in FIG. 7. The production of hammering sounds and the occurrence of abnormal phenomenon may be eliminated by providing an elastic member of rubber or the like on the striking surface of the flow control means or the valve seat. In this case, the elastic member must be considerably small in hardness so as to sufficiently serve as a shock absorber. However, this method causes another problem that the position of abutment and the load of abutment of the flow control means the valve seat are fluctuated. This fluctuation is significant when the valve is opened.

The same thing can be said about a poppet valve. In the case of a poppet valve, because of its structure, its sealing characteristic can be improved relatively readily; however, the above-described hammering sounds and abnormal phenomenon are liable to take place.

In order to eliminate the above-described difficulties, Unexamined Japanese Patent Publication No. 243582/1988 has disclosed a poppet valve which is designed as follows: A valve body of hard resin with a bellows aside is loosely fitted into a moving core (movable iron core) held with a leaf spring. Displacement of the valve body towards the valve seat is limited with a locking piece. An elastic member is arranged between the valve body and the movable iron core, so that the valve body is pushed towards the locking piece with a predetermined force.

The conventional spool type valve may be employed for manufacturing a proportional flow control valve for opening and closing a path adapted to by-pass the throttle valve of an internal combustion engine. However, the valve thus formed suffers from the following difficulties: As was described above, fluid will leak through the gap between the spool, namely, the movable iron core and the sleeve (cylindrical member). Hence, in the region of operation in which the flow rate should be zeroed, it is impossible to completely zero the flow rate. In the case where the valve seat is provided, in the duty control or in the dither control hammering sounds are produced or an abnormal phenomenon occurs when the flow control means reaches or leaves the valve seat. The production of hammering sounds and the occurrence of abnormal phenomenon may be eliminated by providing an elastic member on the striking surface of the flow control means or the valve seat. However, this method causes another problem that the position of abutment and the load of abutment of the flow control means the valve seat are fluctuated.

One example of the poppet valve has tried to solve the above-described problems. In the example, similarly as in the above-described poppet valve, a valve body of hard resin with a bellows is loosely fitted into a movable iron core held with a leaf spring, and it is pushed towards a locking piece by an elastic member. However, the poppet valve is still disadvantageous in the following points: In the poppet valve, it is necessary to determine its operating characteristic from the balance of the force provided by at least two kinds of coil springs, the spring, and the bellows in combination and the force of attraction of the electromagnetic coil. Hence, the determination of the operating characteristic is rather difficult, and is liable to be fluctuated; that is, adjustment of the poppet valve is troublesome. Furthermore, in the above-described example, it is essential to communicate the gap between the valve body and the holding plate, the gap between the holding plate and the magnet plate, and the gap between the movable iron core and the stationary iron core with one another so that the pressures therein be equal to one another; otherwise, a damper effect takes place, thus making it impossible to operate the poppet valve at high speed. Thus, the poppet valve requires a plurality of communicating spaces; in other words, the probability is increased as much that the communicating spaces are clogged up by foreign matters. When the communicating space or spaces are clogged up, the flow characteristic is no longer correct.

If, in the control of the flow rate of by-pass air in an internal combustion engine, a blow-by gas flows to the valve from upstream of the suction passageway or a gas spitted by the engine flows thereto from downstream, then carbon or oil contained in the gas deposits on the sliding surfaces of the valve and the movable iron core in the proportional flow rate control valve, thus adversely affects the slide characteristic of the valve. As a result, the following problems are involved: That is, when the movable iron core is stuck to the valve, the repulsive force cannot be absorbed which may be induced when the valve strikes against the valve seat. As a result, hammering sounds are produced, and the flow characteristic becomes unstable. In the case where the sliding operation is obstructed with the elastic member compressed to some extent, the valve is left opened even if the drive source is turned off; and at worst the engine is rotated excessively; that is, a so-called "engine runaway" takes place.

A valve assembly may be provided which can eliminate the above-described difficulties. In the valve assembly, when the valve (body) moves a predetermined distance after leaving the valve seat, the flow rate is determined from the minimum flow area between the Valve and the valve seat. On the other hand, the valve assembly is so designed that a predetermined striking part is provided for the valve seat with the inclination permitted by the clearance in the sliding region. Therefore, if the gap between the valve seat and the holder (or locking piece) is so small, then the annular gap between the valve seat and the holder is varied irregularly. Thus, the flow characteristic becomes wavy as shown in FIG. 8. Furthermore, if, in the case where the stroke of the valve assembly is increased in order to increase the maximum flow rate thereof, the gap between the valve seat and the holder is excessively small as was described above, then the following problem is involved: That is, even if the stroke of the valve assembly is increased, the small gap between the valve seat and the holder serves as a choke means to limit the flow rate. This difficulty may be eliminated by increasing the inside diameter of the valve seat; however, the increasing of the inside diameter of the valve seat arises another problem that when the diameter of abutment of the valve seat and the valve body is increased, the valve assembly is liable to be non-uniformly pressured, and in order to eliminate this difficulty, it is necessary to increase the diameter of the slide support of the movable iron core, and the resultant proportional flow control valve is unavoidably bulky. In addition, when the diameter of abutment of the valve body and the valve seat is increased as was described above, then the valve assembly is increased in flow gain, and therefore it is lowered in control characteristic.

In addition, since the maximum flow rate is controlled by engagement of the stopper press-fitted in the movable iron core with the tapered end portion of the stationary iron core, hammering sounds are produced by the stopper and the stationary iron core before the valve is fully opened, and the flow characteristic is adversely affected. In order to eliminate this difficulty, the following method has been proposed: even when the supply voltage is maximum, by balancing the electromagnetic force Of attraction with the force of repulsion of the springs, the stroke is made maximum before the stopper strikes engages with the stationary iron core. However, the method is disadvantageous in that, since the fluctuations in the force of attraction and in the elastic force affect the maximum stroke, whereby the maximum flow rate is fluctuated.

SUMMARY OF THE INVENTION

In view of the foregoing, an object of this invention is to provide a proportional flow control valve high in reliability in which the leakage of fluid is substantially zeroed even when fully closed, and the difficulties are eliminated that, when its flow rate adjusting means engages with or disengages from the valve seat, hammering sounds are produced and the flow characteristic is adversely affected, and which is simple in adjustment and is maintained correct in flow characteristic at all times.

Another object of the invention is to provide a proportional flow control valve high in reliability in which the difficulty is eliminated that, where it is employed for controlling the quantity of by-pass air in an internal combustion engine, the carbon or oil contained in a blow-by gas or a gas spitted by the engine deposits on its force-of-repulsion absorbing structure, thus adversely affecting the operation of the valve.

A further object of the invention is to provide a proportional flow control valve in which the difficulty is eliminated that the flow characteristic is made unstable by the inclination of its valve assembly which is due to the clearance in the sliding region, and which can accurately handle a large flow rate without increasing its dimensions.

A still further object of the invention is to provide a proportional flow control valve in which fluctuation of the maximum flow rate is eliminated.

In a first example of a proportional flow control valve according to the invention, a valve seat is provided in the proportional flow control valve body, a valve piece is slidably mounted on a movable iron core, and is urged toward the valve seat by an elastic member disposed between the valve piece and the movable iron core, and a holder is fixedly mounted on the movable iron core so as to limit the movement of the valve piece toward the valve seat caused by the elastic member. The movable iron core, the valve piece, the elastic member and the holder form a valve assembly. The valve assembly thus formed, while being urged by a return spring, is slidably supported by a cylindrical member. At least one of the sliding surfaces of the movable iron core and the valve piece may be coated with a resin material low in frictional coefficient.

In a second example of the proportional flow control valve according to the invention, one end portion of the valve piece is extended in a direction of slide axis in such a manner that the end portion of the valve piece overlaps the end portion of the cylindrical member or vice versa.

In a third example of a proportional flow control valve according to the invention, a valve seat is provided in the proportional flow control valve body, a valve piece is slidably mounted on a movable iron core, and is urged toward the valve seat by an elastic member disposed between the valve piece and the movable iron core, and a holder is fixedly mounted on the movable iron core so as to limit the movement of the valve piece toward the valve seat which is caused by the elastic member, and a spring is provided on one side of the holder on the other side of which the valve piece is provided in such a manner that, with its one end coupled to the proportional flow control valve body, the spring urges the movable iron core through the holder against the elastic force of a return spring. The movable iron core, the valve piece, the elastic member and the holder from a valve assembly. The valve assembly thus formed, while being urged by a return spring, is slidably supported by a cylindrical member. The end portion of the valve piece which is closer to the spring is prolonged in the direction of slide axis in such a manner that it is extended over the surface of abutment of the holder with the valve piece and the front edge of the end portion is flush with the position of abutment of the spring with the holder.

In a fourth example of the proportional flow control valve of the invention, a spring is provided which urges the movable iron core in the direction opposite to the direction of attraction thereby to prevent the abutment of the movable iron core against the stationary iron core, and the valve seat has a cylindrical portion which, when the valve piece is moved a predetermined distance from the valve seat, sets to a predetermined value a maximum fluid passageway area defined by the valve piece and the valve seat.

In a fifth example of the proportional flow control valve of the invention, a spring is provided which urges the movable iron core in the direction opposite to the direction of attraction thereby to prevent the abutment of the movable iron core against the stationary iron core, and the holder has a cylindrical portion which, when the valve piece is moved a predetermined distance from the valve seat, sets to a predetermined value a maximum fluid passageway area defined by the valve piece and the valve seat.

In the proportional flow control valve of the invention, the valve assembly including the movable iron core, the valve piece, the elastic member and the holder is abutted against the valve seat by the elastic force of the return spring with the movable iron core urged away from the valve piece by the elastic member. Therefore, when, in the duty control or dither control of the flow rate of fluid, the valve assembly is slightly vibrated to engage with or disengage from the valve seat to produce the force of repulsion, the force of repulsion thus produced is absorbed by the elastic member. Hence, in the control valve of the invention, the difficulty is eliminated that the valve piece strikes against the valve seat to produce hammering sounds, and the flow characteristic is maintained stable.

Furthermore, in the proportional flow control valve of the invention, the sliding surfaces of the movable iron core and the valve piece are coated with a resin material low in frictional coefficient; that is, these sliding surfaces are reduced in friction, as a result of which formation of abrasion powder is minimized. Accordingly, the sliding clearance can be decreased as much. Thus, the difficulty can be prevented that the operation becomes unsatisfactory because of the entrance of foreign matter into the sliding clearance or because of the inclination of the valve and the movable iron core with respect to each other.

In another example of the proportional flow control valve of the invention, the end portion of the valve piece overlaps the end portion of the cylindrical member in the direction of slide axis. This construction eliminates the difficulty that the blow-by gas or the gas spitted by the engine flows directly to the sliding surfaces of the valve piece and the movable iron core, and accordingly the difficulty that the carbon or oil contained in the gas deposits on the sliding surfaces.

In another example of the proportional flow control valve of the invention, the end portion of the valve piece which is closer to the spring is protruded in the direction of slide axis in such a manner that it is extended over the abutment surface of the holder with the valve piece and the front edge of the valve piece is flush, at least, with the position of abutment of the spring with the holder. Therefore, even when the valve piece is moved a predetermined distance away form the valve seat, the holder will not obstruct the flow of fluid nor deflect it. Thus, the flow characteristic is maintained stable, and even when the stroke is increased for the maximum flow rate, the gap between the holder and the valve seat will not serve as choke means.

Furthermore, in another example of the proportional flow control valve according to the invention, the elastic force is balanced with the force of attraction so that the movable iron core may not strike against the stationary iron core. In addition, when the valve piece is moved a predetermined distance from the valve seat with the movable iron core moved away from the stationary iron core by the force of attraction of the exciting coil, the maximum fluid passageway area is made substantially constant being set to the passageway area between the cylindrical portion of the valve seat and the outer cylindrical surface of the valve piece or to the passageway area between the cylindrical portion of the holder and the inner cylindrical surface of the valve piece.

DETAILED DESCRIPTION OF THE PREFERRED EMBODIMENTS

Figure 5:
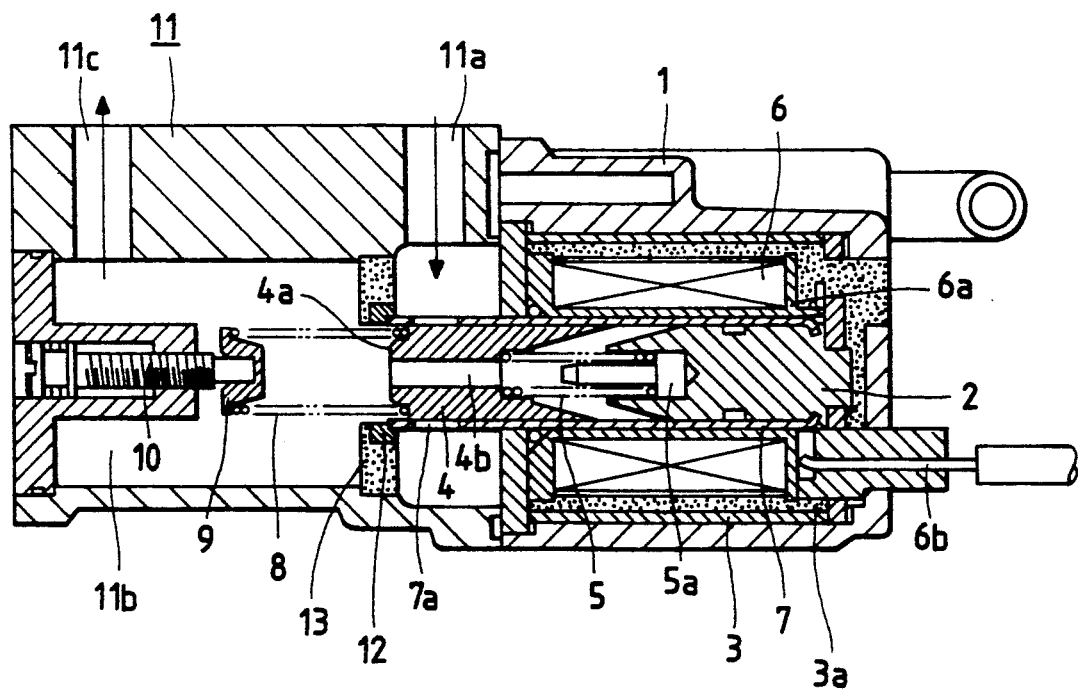
FIG. 5 is a longitudinal sectional view of a conventional proportional flow control valve of spool type.

An example of a proportional flow control valve, which constitutes a first embodiment of the invention, will be described with reference to FIGS. 1A and 1B, in which parts corresponding functionally to those which have been described with reference to FIG. 5 showing the prior art are therefore designated by the same reference numerals or characters.

Figure 1A:
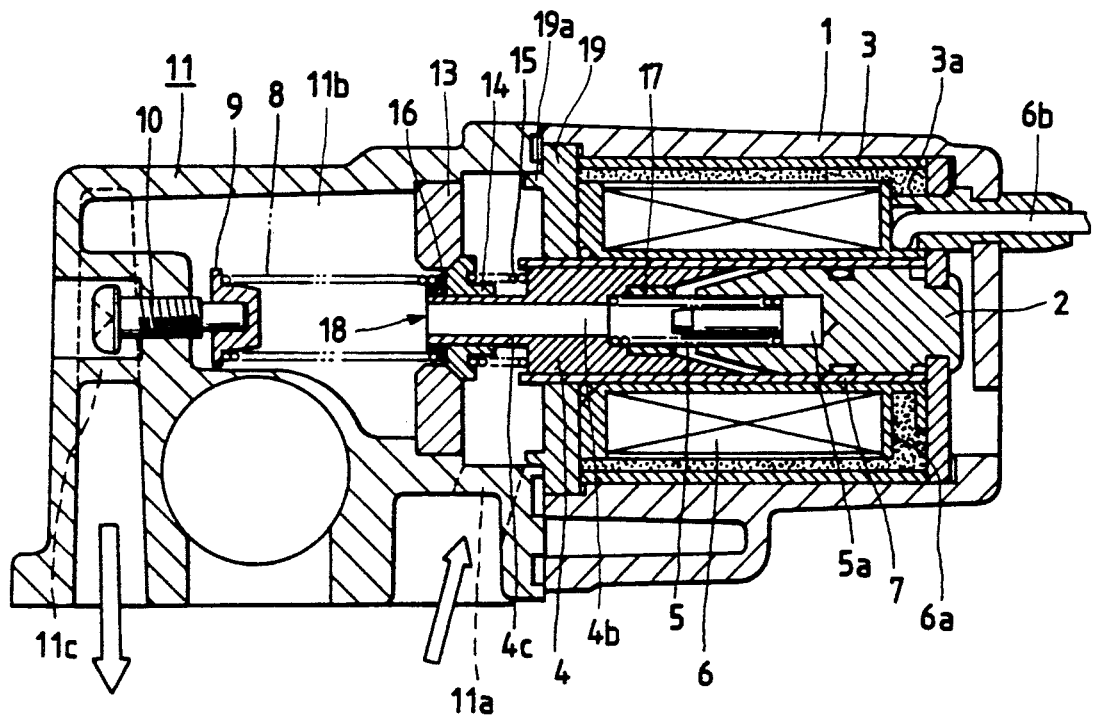
FIG. 1A is a longitudinal sectional view showing one example of a proportional flow control valve which constitutes a first embodiment of this invention.
Figure 1B:
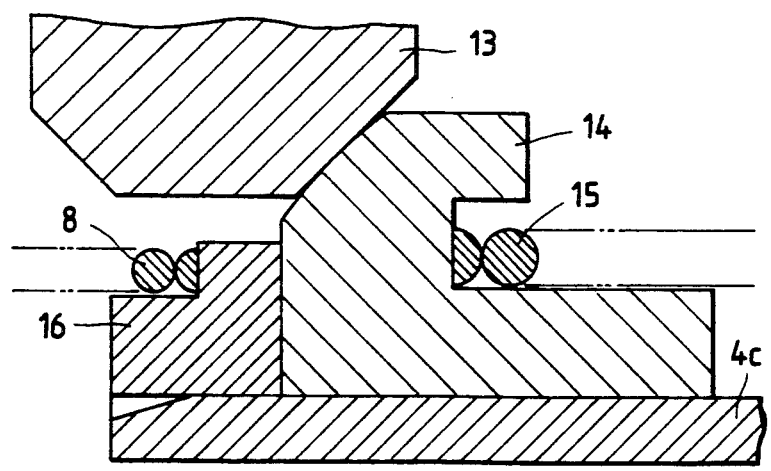
FIG. 1B is an enlarged sectional view of essential components of the control valve.

In FIGS. 1A and 1B, reference numeral 1 designates a solenoid unit, in which a stationary iron core 2 is arranged in such a manner that it is extended longitudinally; 3, a cylindrical case which is fitted into the housing of the solenoid unit 1; 4, a movable iron core arranged in such a manner as to confront with the stationary iron core 2; and 5, a return spring disposed between the stationary iron core 2 and the movable iron core 4.

One end portion 4c of the movable iron core 4 is smaller in diameter than the other (the portion will be referred to as "a small diameter portion 4c", when applicable). A valve piece 14 is slidably mounted on the smaller diameter portion 4c. A spring 15 is mounted on the smaller diameter portion 4c so as to urge the valve piece 14 towards the front end of the movable iron core. A holder 16 is fixedly mounted on the smaller diameter portion 4c at the end to detain the valve piece 14. Furthermore, a stopper 17 is coupled to the other end portion of the movable iron core 4 to limit the movement of the valve in the opposite direction. The aforementioned spring 15 pushes the valve 14 and the movable iron core 4 away from each other, so that the valve piece 14 is abutted against the holder 16. The movable iron core 4, the valve 14 piece, the spring 15 and the holder 16 form a valve assembly 18.

The stationary iron core 2 and the movable iron core 4 are inserted into a pipe 7 in such a manner that they are confronted with each other. A bobbin 6a, on which an electromagnetic coil 6 has been wound, is mounted on the pipe 7. An insulating material 3a are inserted between the case 3 and the bobbin 6a. A return spring 5 is interposed between the stationary iron core 2 and the movable iron core 4 with the aid of a spring 5a, so as to urge the movable iron core 4 against the electromagnetic force of attraction of the electromagnetic coil 6. That is, the movable iron core 4 is kept urged to the left in FIG. 1 by the return spring 5. The electromagnetic coil 6 is connected to a lead wire 6b which is extended outside of the solenoid unit.

A spring 8 is provided on the side of the movable iron core 4 which is opposite to the side where the return spring 5 is provided. More specifically, the spring 8 is disposed between a spring holder 9 and the holder 16 which is mounted on the smaller diameter portion 4c of the movable iron core 4 at the end as was described before. The spring holder 9 is secured to the end portion of an adjusting screw 10 engaged with the proportional flow control valve body 11.

The proportional flow control valve body 11 has a fluid inlet passageway 11a near in one end portion which is near the solenoid unit 1, and a fluid outlet passageway 11c in the other end portion (or in the left end portion in FIG. 1).

The solenoid unit 1 and the proportional flow control valve body 11 are fixedly engaged with each other with the valve body 11 fitted fixedly to the rib-shaped guide portion 19a of a guide member 19 which is fixedly fitted into the end portion of the solenoid unit. The guide member 19 supports the end portion of the pipe 7 which slidably supports the movable iron core 4. A valve seat 13 is fitted in the proportional flow control valve body 11 in such a manner as to confront with the above-described valve assembly, so that a chamber 11b communicated with the fluid outlet passageway 11c is separated from the fluid inlet passageway 11a.

The adjusting screw 10 is screwed into the proportional flow control valve body 11 from the end portion including the fluid outlet passageway 11c towards the movable iron core 4. The spring 8 coupled to the adjusting screw 10 urges the movable iron core 4 in the direction at all times in which the electromagnetic force of attraction acts.

The valve assembly 18, being urged by the spring 8 and the return spring 5, is abutted against the valve seat 13 with the movable iron core 4 allowed to incline by the clearance between the movable iron core 4 and the pipe 7. The elastic force of the spring 8 connected between the holder 16 and the spring holder 9 has been adjusted by the adjusting screw 10 in advance; that is, the force of the valve assembly 18 to push the valve seat 13 has been adjusted. In this case, the load of abutment of the valve piece 14 and the holder 16 is made smaller than that which is due to the spring 15 so that, when the valve is fully opened, the valve 14 is brought into close contact with the holder 16.

The valve seat 13 is tapered to have a conical seat surface, while the abutment surface of the valve piece 14 is spherical. The diameter of the circle which the conical seat surface and the spherical abutment surface form when engaged with each other is, for instance, eleven millimeters (11 mm), which is substantially equal to the slide diameter of the movable iron core 4 and the pipe 7. The valve seat 13 and the valve piece 14 may be formed using polybutylene terephthalate (PBT).

The movable iron core 4 has a communication hole 4b along its central axis so that the pressure in the chamber 11b communicated with the fluid outlet passageway 11c is balanced with the pressure in the chamber which is defined by the movable iron core 4 and the stationary iron core 2. The maximum diameter of the communication hole 4b is at least 3 mm.

Figure 2:
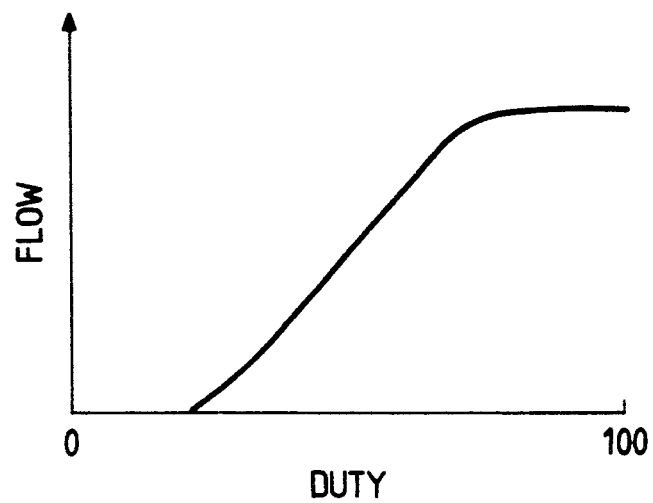
FIG. 2 is a graphical representation showing the flow characteristic of the control valve.

When, in the proportional flow control valve thus constructed, the electromagnetic coil 6 is energized, the movable iron core 4 is moved towards the stationary iron core 2 against the elastic force of the returned spring 5; that is, the valve assembly 18 is moved to open the valve. In the case of controlling the flow rate of a fluid with the proportional fluid control valve in accordance with the duty control method or dither control method, the valve assembly is vibrated slightly depending on the control method, so that a force of repulsion is produced by the collision caused at the time of valve engagement or valve disengagement; however, the force of repulsion is absorbed by the spring 15. Thus, as shown in FIG. 2, the sealing characteristic of the valve is ensured when the duty is zero. That is, the flow characteristic is maintained stable at all times.

In the embodiment, the solenoid unit 1 is fixedly coupled to the proportional flow control valve through the guide member 19, and therefore the shift of the valve assembly from the valve seat 13 in the region of abutment is caused only by the inclination of the valve assembly 18 which is due to the clearance between the movable iron core 4 and the pipe 7. Furthermore, since, as was described before, the seat surface of the valve seat 13 is conical while the abutment surface of the valve piece 14 is spherical, the valve piece 14 and the valve seat 13 form a circle having a predetermined diameter when they are engaged with each other, thus ensuring the sealing characteristic. The slide clearance between the movable iron core 4 and the pipe 7 is ranged from 0.02 mm to 0.2 mm, and the ratio of a slide length L to a slide diameter D (L/D) is at least 1.5.

In the embodiment, the circle of abutment of the valve seat 13 and the valve piece 14 is substantially equal to the slide diameter of the movable iron core 4 and the pipe 7. Therefore, even if, when the control valve is not energized, the negative pressure in the suction pipe is applied to the fluid outlet passageway 11c, the forces applied to the valve assembly through the communication hole 4b from right and left are balanced with each other, so that the valve assembly is held stable.

In the proportional flow control valve thus constructed, the valve piece 14, striking against the valve seat 13, is moved while the force of repulsion applied to the valve piece is being absorbed by the spring 15. If, in this case, abrasion powder is formed on the slide surface of the valve piece 14 and the smaller diameter portion 4c of the movable iron core 4 or the slide surface is contaminated with foreign matters, or the valve piece 14 and the movable iron core 4 are inclined with respect to each other, then the valve piece 14 may not be able to smoothly move along the smaller diameter portion 4a of the movable iron core 4, which results in the following difficulties: In the case where the sliding operation is obstructed with the valve piece 14 stuck fixedly on the movable iron core 4, it is impossible to absorb the force of repulsion produced when the valve piece 14 strikes against the valve seat 13. In the case where the sliding operation is obstructed with the spring 15 compressed to an extent, even if the drive source is turned off the valve piece 14 is held opened, and at worst the engine is rotated excessively; that is, a so-called "engine runaway" takes place. In order to overcome these difficulties, in the embodiment at least one of the sliding surfaces of the smaller diameter portion of the movable iron core 4 and of the valve piece 14 is coated with resin such as "Teflon (trade mark)" low in frictional coefficient to a thickness of 10 to 30 μ. It is preferable to coat the sliding surface of the movable iron core 4 in the pipe 7 in the same manner. For this purpose, a method may be employed in which the coating operation is carried out while the movable iron core is being rotated. This coating method is advantageous in that the film thickness of a coating formed is smaller than the film thickness of a coating formed by dipping, and only necessary parts can be coated. In addition, the small diameter portion 4c of the movable iron core 4 which portion is slidably brought into contact with the valve piece 14, and the cylindrical surface of the body of the movable iron core 4 which is slidably engaged with the inner surface of the pipe 7 may be coated at the same time. In this case, masking is unnecessary, and accordingly the coating operation can be achieved readily.

As the sliding surfaces of the valve piece 14 and the movable iron core 4 are coated in the above-described manner, those sliding surfaces are reduced in friction, and the production of abrasion powder is decreased as much. The reduction of friction makes it possible to decrease the slide clearance, and accordingly to prevent the entrance of small foreign matters thereinto, and to positively prevent the unsatisfactory operation of the control valve which attributes to the inclination of the valve assembly.

The holder 16 may be fixedly mounted on the movable iron core 4 by press-fitting, welding, or by caulking. The end portion of the smaller diameter portion 4c of the movable iron core 4 may be formed into a much smaller diameter portion so that the holder is fixedly mounted on the much smaller diameter portion thus formed.

The abutment surfaces of the valve piece 14 and the valve seat 13 may be so modified that the valve piece 14 has a stepped conical abutment surface, and the valve seat 13 has a spherical seat surface.

Now, a second embodiment of the invention will be described with reference to FIGS. 3A and 3B.

In the second embodiment, its valve piece 14 has flange portion which is closer to the pipe 7 is made larger in diameter than the pipe 7 in such a manner as to surround the end portion of the pipe 7. The amount of overlap (l) of the flange portion of the valve piece 14 with the end portion of the pipe 7 in the direction of slide axis is so determined that it is predetermined minimum value when the valve piece 14 has engaged with its valve seat 13 and that the valve piece 14 will not strike against the guide member 19 even when the valve is fully opened; i.e., when the electromagnetic coil 6 is energized to move the movable iron core 4 towards the stationary iron core against the elastic force of the return spring 5 thereby to move the valve assembly 18.

In the second embodiment, the flow characteristic is such that no hammering sounds are produced, and no abnormal o phenomena take place. As was described above, the valve piece 14 has the flange portion which overlaps the end portion of the pipe 7. Hence, even in the case where the proportional flow control valve is used to control the quantity of by-pass gas in an internal combustion engine, the difficulty can be eliminated that the blow-by gas or the gas spitted by the engine flows directly to the sliding surfaces of the valve piece 14 and the movable iron core 4 so that the carbon or oil contained in the gas deposits on the sliding surfaces.

In the above-described second embodiment, the end portion of the pipe 7 is surrounded by the end portion of the valve piece 14; however, it may be so designed that the end portion of the valve piece is surrounded by the end portion of the pipe 7.

Now, a third embodiment of the invention will be described with reference to FIGS. 4A and 4B.

In the third embodiment, its valve piece 14 is designed as follows: The end portion of the valve piece 14, which is abutted against the holder 16 and is closer to the spring 8, is extended in such a manner that it surrounds the periphery of the holder 16; that is, it is extended over the region of abutment of the valve piece 14 and the holder 16 in the direction of slide axis. The end face of the end portion thus extended is spherical (hereinafter referred to as "a spherical abutment surface", when applicable) which is abutted against the tapered seat surface of the valve seat 13. The front edge (indicated by line (1) in FIG. 4B) of the spherical abutment surface of the valve piece comes in front of the position (indicated by line (2) in FIG. 4B) of abutment of the spring 8 with the holder 16. In FIG. 4B, line (3) indicates the position of abutment of the valve piece 14 with the valve seat 13.

As was described above, in the third embodiment, the valve piece 14 has the end portion is extended so as to surround the periphery of the holder 16, and the front edge of the end portion thus extended comes in front of the position of abutment of the spring 8 with the holder 16. Therefore, even when the valve piece 14 moves a certain distance from the valve seat, the flow of fluid will not be disturbed nor changed in direction by the holder 16.

In the third embodiment described above, the front edge of the valve piece 14 is set in front of the position of the abutment of the spring 8 with the holder 16; however, its position may be flush with the position of abutment of the spring 8 with the holder 16.

A fourth embodiment of the invention will be described with reference to FIGS. 9 and 10.

Figure 3A:
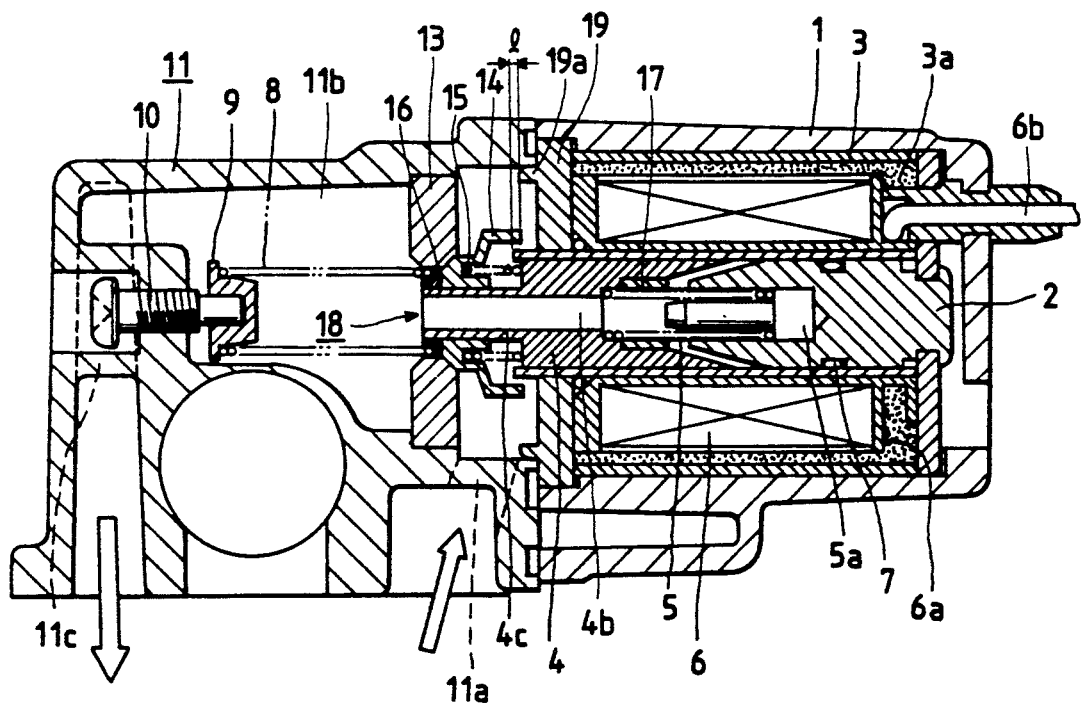
FIG. 3A is a longitudinal sectional view showing another example of the proportional flow control valve which constitutes a second embodiment of this invention.
Figure 3B:
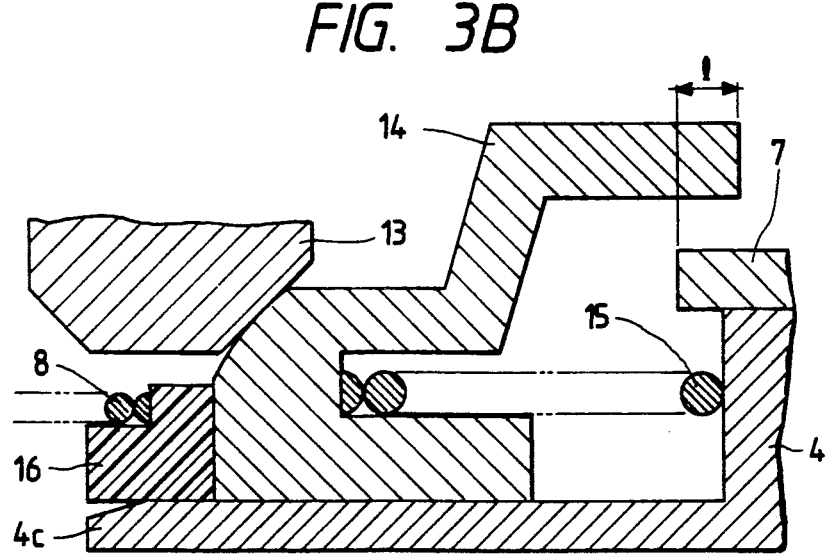
FIG. 3B is an enlarged sectional view of essential components of the control valve.
Figure 4A:
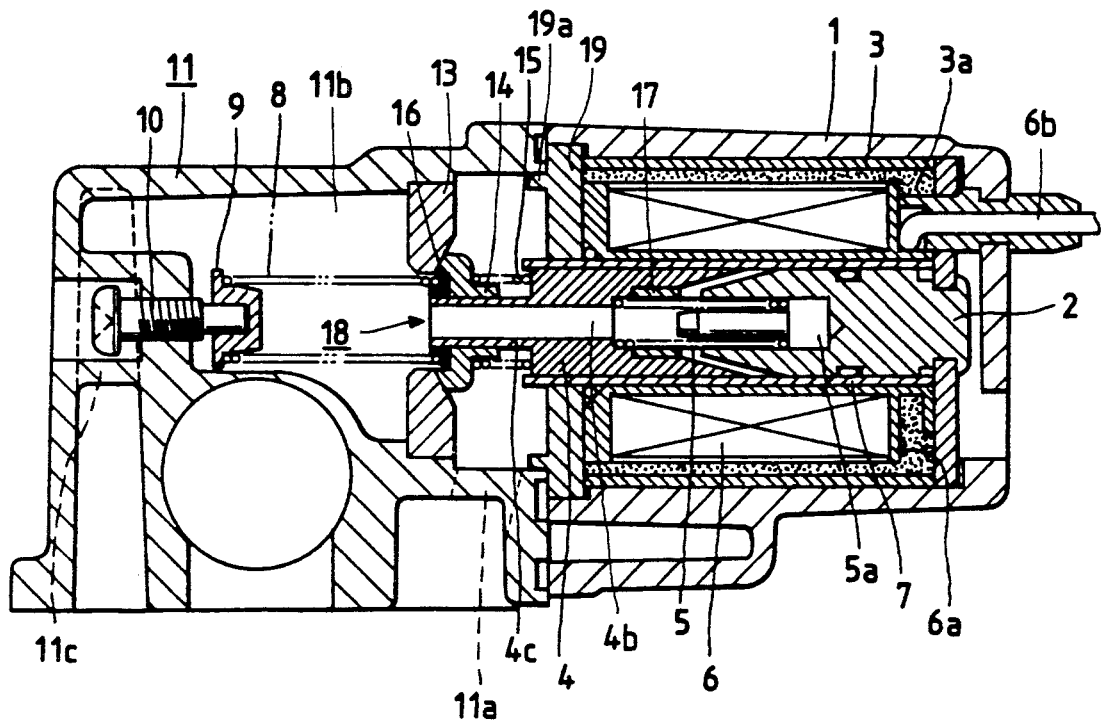
FIG. 4A is a longitudinal sectional view showing another example of the proportional flow control valve which constitutes a third embodiment of this invention.
Figure 4B:
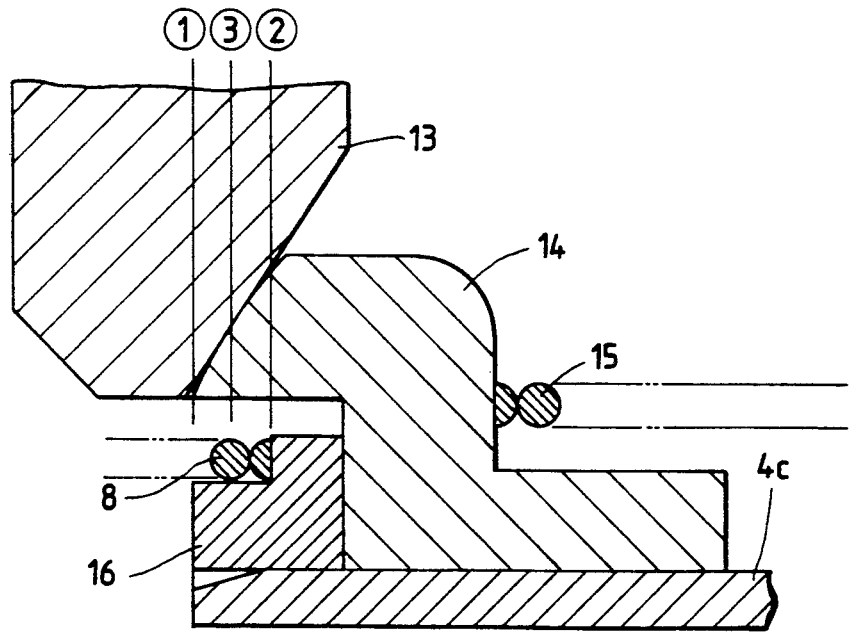
FIG. 4B is an enlarged sectional view of essential components of the control valve.
Figure 6:
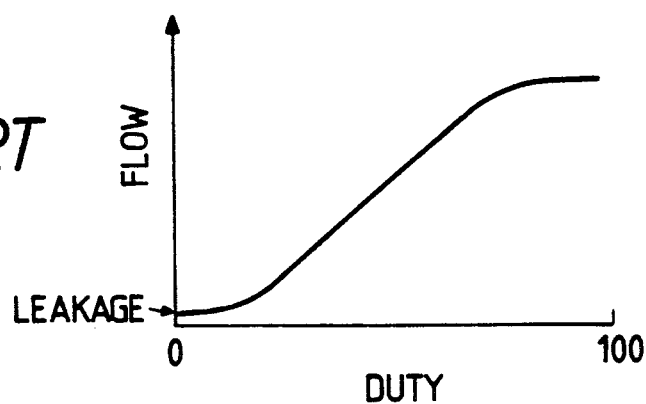
FIG. 6 is a graphical representation indicating the flow characteristic of the conventional control valve shown in FIG. 5.
Figure 7:
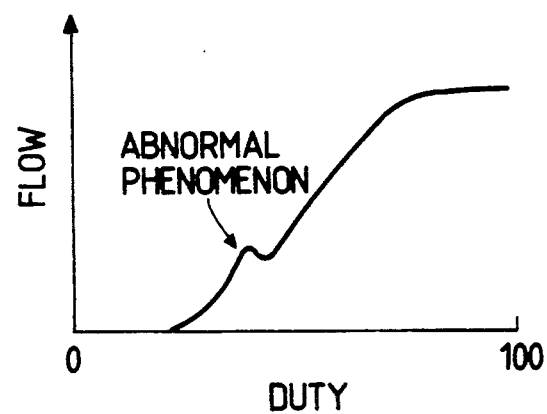
FIG. 7 is a graphical representation indicating a typical flow characteristic of a conventional poppet type valve.
Figure 8:
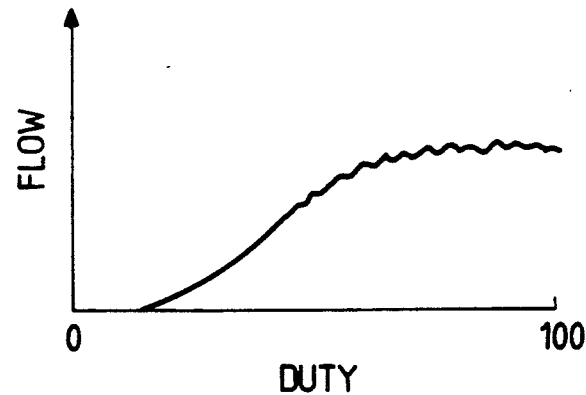
FIG. 8 is a graphical representation indicating a flow characteristic for a description of variations in flow rate which are due to the inclination of a valve assembly.
Figure 9:
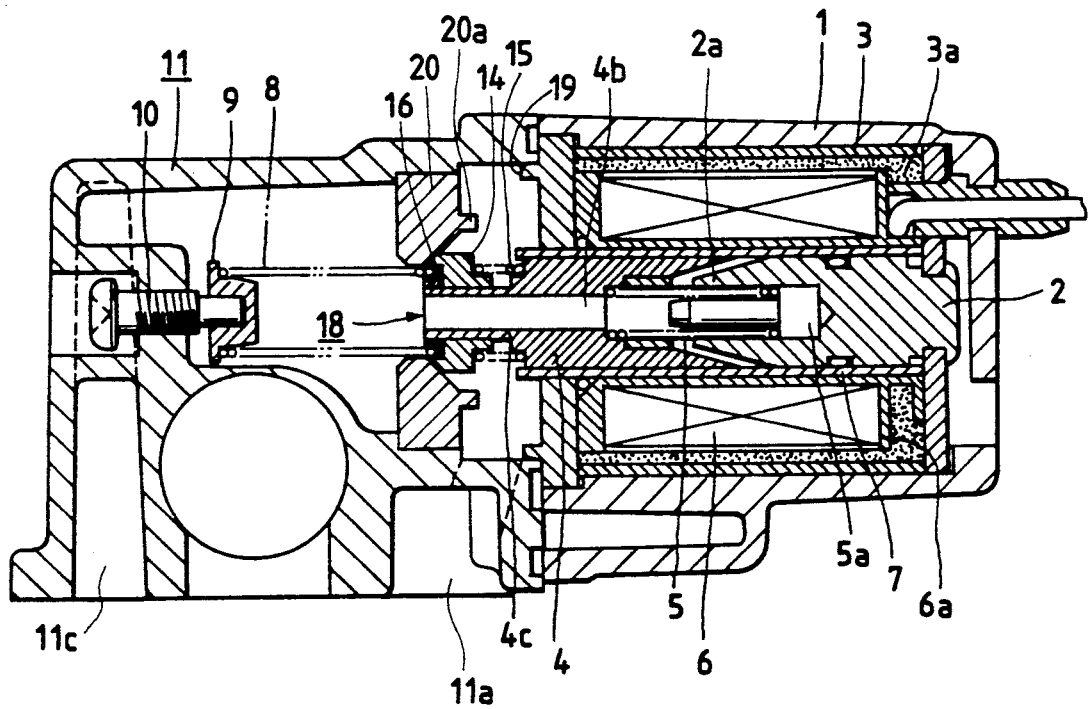
FIG. 9 is a longitudinal sectional view showing another example of the proportional flow control valve which constitutes a fourth embodiment of the invention.
Figure 10:
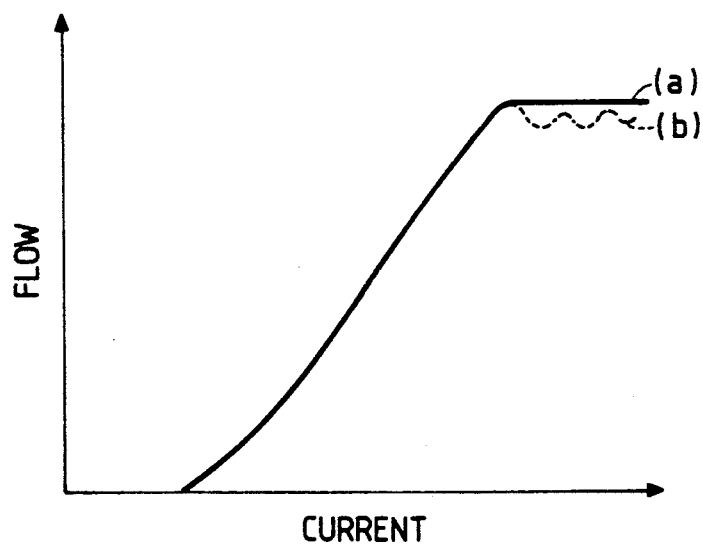
FIG. 10 is a graphical representation indicating a flow characteristic thereof.

As is apparent from the comparison of FIG. 9 showing the fourth embodiment and FIGS. 1A, 3A and 4A showing the first, second and third embodiments, the fourth embodiment is different from the first, second and third embodiments in that it has no stopper 17 and a valve seat 20 has a cylindrical portion 20a on its surface which is closer to the stationary iron core 2. Furthermore, the fourth embodiment is so designed that, even when the electromagnetic coil 6 is energized maximum, the electromagnetic force of attraction is balanced with the elastic force of the springs 5 and 8 thereby to prevent the abutment of the movable iron core 4 against the stationary iron core 2.

In the fourth embodiment, since the movable iron core 4 will never strike against the stationary iron core 2, no hammering sound is produced, and the flow characteristic is stable. When the electromagnetic coil 6 is energized to move the movable iron core towards the stationary iron core 2 thereby to disengage the valve piece 14 from the valve seat 20, the flow rate is increased in proportion with the distance between the valve piece and the valve seat. When the distance becomes a predetermined value or higher, the fluid passage area becomes constant being substantially regulated by the area between the outer periphery of the valve piece 14 and the cylindrical portion 20a of the valve seat 20. Hence, the flow characteristic is as indicated at (a) in FIG. 10 ((b) indicating the flow characteristic of the proportional flow control valve with the stopper 17); that is, even if the force of attraction or the elastic force is fluctuated, the maximum flow rate is maintained unchanged.

Figure 11:
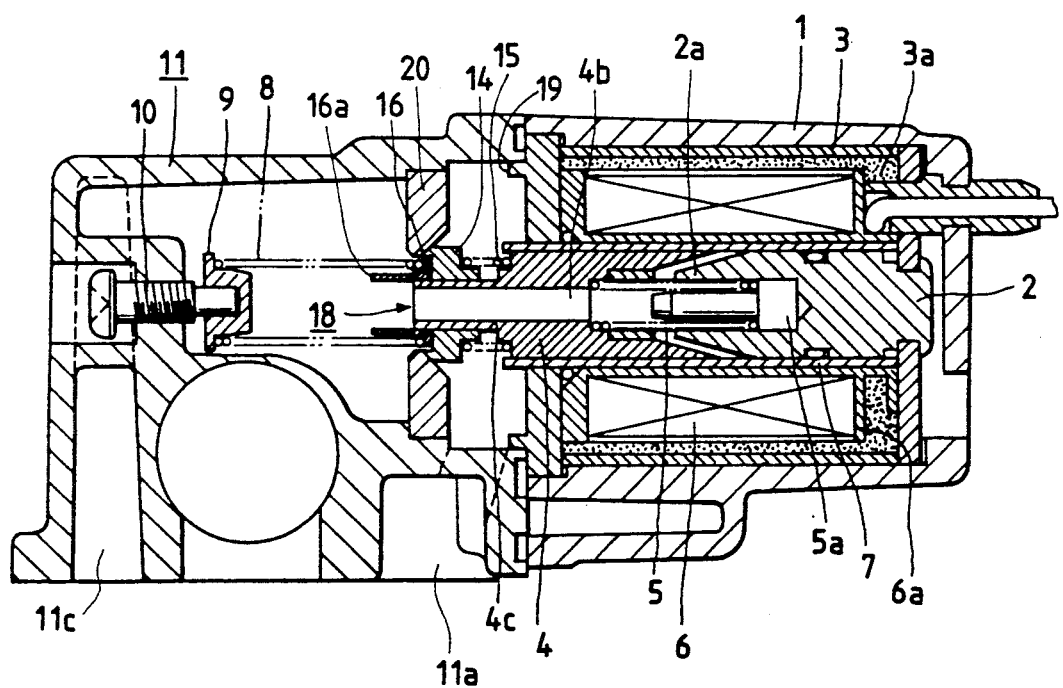
FIG. 11 is a longitudinal sectional view showing another example of the proportional flow control valve which constitutes a fifth embodiment of the invention.

A fifth embodiment of the invention is as shown in FIG. 11. The fifth embodiment is different from the above-described fourth embodiment in that the valve seat 20 has no cylindrical portion 20a, and instead a cylindrical portion 16a is formed on the side of the holder 16 which is farther from the stationary iron core 2. Similarly as in the case of the fourth embodiment shown in FIG. 9, when the valve piece 14 leaves the valve seat 20 a predetermined distance or more, the fluid passage area becomes constant being regulated by the passage area between the cylindrical portion 16a of the holder 16 and the inner periphery of the valve seat 20. Hence, the fifth embodiment shows the same effects as the fourth embodiment.

As was described above, in the proportional flow control valve according to the invention, the valve assembly is made up of the movable iron core, the valve piece, the elastic member and the holder, and the valve assembly thus formed is slidably supported by the cylindrical member while being urged with the return spring, whereby the leakage of fluid is prevented when the valve is fully opened; that is, the sealing characteristic is ensured. Furthermore, in the case where the duty control or dither control is employed to control the flow rate of fluid, the force of repulsion produced when the valve engages with or disengaged from the seat (attributing to the duty control or dither control) can be absorbed, whereby no hammering sound is produced, and the flow characteristic is maintained stable. In addition, the adjustment can be achieved with ease, so that the flow characteristic is maintained correct at all times. Thus, what is provided by the invention is a proportional flow control valve of full close type which is high in reliability.

As at least one of the sliding surfaces of the movable iron core and the valve piece is coated with resin low in frictional coefficient, the friction of the sliding region of the movable iron core is reduced, whereby the production of abrasion powder is prevented. Since the sliding clearance can be made small, the unsatisfactory operation due to the entrance of small foreign matters or the inclination of the valve assembly iron core can be prevented. Thus, the proportional flow control valve of full close type is further improved in reliability.

Furthermore, the sliding surfaces of the movable iron core which engage with the valve piece and the cylindrical member, respectively, can be coated at the same time. In this case, masking is unnecessary, and accordingly the coating operation can be achieved readily.

In another example of the proportional flow control valve of the invention, the end portion of the valve piece is overlapped with the end portion of the cylindrical member. Hence, the leakage of fluid is prevented when the valve is fully opened; that is, the sealing characteristic is ensured. Furthermore, in the case where the duty control or dither control is employed to control the flow rate of fluid, the force of repulsion produced in attribution to the control when the valve engages with or disengaged from the seat can be absorbed, whereby no hammering sound is produced, and no abnormal phenomenon occurs with the flow characteristic. Furthermore, with the proportional flow control valve of the invention, the difficulty is eliminated that, in controlling the quantity of air for an engine, the blow-by gas from upstream of the suction passageway or the gas spitted by the engine from downstream of the suction passageway flows directly to the sliding surfaces of the valve piece and the movable iron core so that the carbon or oil contained in the gas deposits on the sliding surfaces. Thus, the components of the valve assembly can be maintained satisfactory in sliding characteristic at all times. Accordingly, in the proportional flow control valve of the invention, no hammering sound is produced, and the flow characteristic is maintained stable. Thus, the proportional flow control valve according to the invention is high in reliability.

In another example of the proportional flow control valve of the invention, the end portion of the valve piece is extended in such a manner that it surrounds the holder and that the front edge of the end portion thus extended is flush with the position of abutment of the spring with the holder. Therefore, even in the case where the duty control method or dither control method is employed for controlling the flow rate of fluid, the full close function can be ensured, and the force of repulsion produced when the valve piece engages with or disenqaqes from the valve seat can be absorbed, whereby no hammering sound is produced, and the flow characteristic is maintained stable. Furthermore, the difficulty can be eliminated that the flow rate of fluid is affected by the inclination of the valve assembly. In addition, an increase of the maximum flow rate can be achieved without increase in the size of the proportional flow control valve nor in the flow gain with respect to the stroke of the valve. Thus, the invention can provides a proportional flow control valve of full close type stable in characteristic and excellent in controllability.

In another example of the proportional flow control valve, the movable iron core is not brought into contact with the stationary iron core, and therefore no hammering sound is produced, the flow characteristic is maintained stable. Furthermore, in the control valve, when the valve piece is moved a predetermined distance or more from the valve seat the flow rate of fluid is maintained constant by the fluid passageway between by the cylindrical portion of the valve seat and the valve piece or between the cylindrical portion of the holder and the valve seat. Hence, even if the force of attraction or the elastic force is fluctuated, the fluctuation of the maximum flow rate can be prevented. Moreover, the elastic member provided between the movable iron core and the valve piece absorbs the force of repulsion produced when the valve piece strikes against the valve seat, whereby no hammering sound is produced, and the flow characteristic is maintained satisfactory at all times.

What is claimed is:

1. A proportional flow control valve comprising: an electromagnetic coil for forming a magnetic field when energized with electric current; a case of a magnetic substance for accommodating said electromagnetic coil; a stationary iron core forming a magnetic circuit with said case; a movable iron core arranged slidably in a cylindrical member so as to be slid towards said stationary iron core by the electromagnetic force of attraction of said electromagnetic coil; and a return spring for urging said movable iron core in a direction opposite to the direction of said electromagnetic force of attraction, for controlling a flow rate of a fluid flowing through a fluid inlet passageway in a proportional flow control valve body to a fluid outlet passageway therein by the sliding operation of said movable iron core, said proportional flow control valve further comprising;

a valve seat installed in said proportional flow control valve body, wherein said valve seat is tapered to have a conical seat surface;

a valve piece slidably mounted on said movable iron core, said valve piece having a spherical abutment surface;

an elastic member disposed between said movable iron core and said valve piece, urging said valve piece towards said valve seat; and a holder secured to said movable iron core, for limiting the movement of said valve piece towards said valve seat by said elastic member, said movable iron core, said valve piece, said elastic member and said holder forming a valve assembly which is urged by said return spring and slidably supported by said cylindrical member.

2. A proportional flow control valve comprising: an electromagnetic coil for forming a magnetic field when energized with electric current; a case of a magnetic substance for accommodating said electromagnetic coil; a stationary iron core forming a magnetic circuit with said case; a movable iron core arranged slidably in a cylindrical member so as to be slid toward said stationary iron core by the electromagnetic force of attraction of said electromagnetic coil; and a return spring for urging said movable iron core in a direction opposite to the direction of said electromagnetic force of attraction, for controlling a flow rate of a fluid flowing through a fluid inlet passageway in a proportional flow control valve body to a fluid outlet passageway therein by the sliding operation of said movable iron core, said proportional flow control valve further comprising;

a valve seat installed in said proportional flow control valve body;

a valve piece slidably mounted on said movable iron core, wherein said valve piece comprises an end portion which is extended in a direction of a slide axis to overlap an end portion of said cylindrical member which is closer to said valve piece;

an elastic member disposed between said movable iron core and said valve piece, urging said valve piece towards said valve seat; and a holder secured to said movable iron core, for limiting the movement of said valve piece toward said valve seat by said elastic member, said movable iron core, said valve piece, said elastic member and said holder forming a valve assembly which is urged by said return spring and slidably supported by said cylindrical member.

3. A proportional flow control valve as claimed in claim 2, further comprising a spring provided on one side of said holder which is opposite to the side where said valve piece is provided, said spring having one end secured to said proportional flow control valve body and urging said movable iron core against the elastic force of said return spring.

4. A proportional flow control valve as claimed in claim 1, wherein said valve seat comprises a cylindrical portion for setting a maximum fluid passage area which is formed between said valve seat and said valve piece, when said valve piece is moved over a predetermined distance from said valve seat.

5. A proportional flow control valve as claimed in claim 4, wherein said cylindrical portion is formed on said holder.

6. A proportional flow control valve as claimed in claim 4, wherein said cylindrical portion is formed on said valve seat.

7. A proportional flow control valve as claimed in claim 2, wherein at least one of the sliding surfaces of said movable iron core and valve piece is coated with a resin material low in frictional coefficient.

8. A proportional flow control valve as claimed in claim 1, wherein the diameter of a circle constructed along an interface between said valve seat and said valve piece is substantially equal to a slide diameter of said movable iron core and said cylindrical member.

* * * * *